(12) United States Patent
Ganille et al.

(10) Patent No.: US 10,593,303 B2
(45) Date of Patent: Mar. 17, 2020

(54) METHOD AND SYSTEM FOR READJUSTING, VIA AN SVS SYNTHETIC VISION SYSTEM, ON A WORN HEAD-UP DISPLAY, A SYMBOLOGY WHICH PERTAINS TO THE PILOTING OF AN AIRCRAFT AND WHICH IS CONFORMAL TO THE REAL OUTSIDE WORLD

(71) Applicant: THALES, Courbevoie (FR)

(72) Inventors: Thierry Ganille, Merignac (FR); Daniel Maulet, Saint Marcel les Valence (FR); Olivier Lemoine, Jaillans (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/213,932

(22) Filed: Dec. 7, 2018

(65) Prior Publication Data
US 2019/0197995 A1 Jun. 27, 2019

(30) Foreign Application Priority Data
Dec. 21, 2017 (FR) .................................. 17 01340

(51) Int. Cl.
*G09G 5/38* (2006.01)
*G06F 3/01* (2006.01)
(Continued)

(52) U.S. Cl.
CPC ............. *G09G 5/38* (2013.01); *G01C 21/165* (2013.01); *G02B 27/01* (2013.01);
(Continued)

(58) Field of Classification Search
None
See application file for complete search history.

(56) References Cited

U.S. PATENT DOCUMENTS 10,124,907 B1 * 11/2018 Gavrilets ............... G08G 5/025
2007/0297696 A1 * 12/2007 Hamza ..................... G06T 7/35
382/294
(Continued)

FOREIGN PATENT DOCUMENTS

WO 2009/081177 A2 7/2009
WO 2015/165838 A1 11/2015

OTHER PUBLICATIONS

Tuceryan, et al., "Single point active alignment method (SPAAM) for optical see-through HMD calibration for AR", Proceedings of the IEEE and ACM International Symposium of Augmented Reality, pp. 149-158, Munich, Germany, Oct. 5, 2000.
(Continued)

*Primary Examiner* — YuJang Tswei
(74) *Attorney, Agent, or Firm* — Baker & Hostetler LLP

(57) ABSTRACT

A method is provided for readjusting a worn head-up display via an SVS synthetic vision system for viewing information pertaining to the piloting of an aircraft, the information being conformal with the real outside world, comprises steps consisting in: launching the readjusting method by displaying all or some of the conformal piloting information in a readjusting state, frozen on the display with respect to head movements and free with respect to the movement of the aircraft; then carrying out a series of N measurements of relative orientations $K_i$ of the head corresponding to targeting actions Vi that superpose the various elements of piloting information displayed in the readjusting state with corresponding landmarks of the real outside world; then conjointly determining the relative orientation M01 between the display D0 and the tracking mobile element D1 and the relative orientation M3t of the inertial device D3 with respect to the Earth on the basis of a system of dual harmonization equations using the measurements $\hat{K}_i$.

14 Claims, 4 Drawing Sheets

(51) Int. Cl.
*G02B 27/01* (2006.01)
*G01C 21/16* (2006.01)
*G01C 23/00* (2006.01)

(52) U.S. Cl.
CPC .......... *G02B 27/0172* (2013.01); *G06F 3/011* (2013.01); *G06F 3/012* (2013.01); *G01C 23/00* (2013.01); *G02B 2027/014* (2013.01); *G02B 2027/0141* (2013.01); *G09G 2340/0464* (2013.01); *G09G 2340/12* (2013.01); *G09G 2354/00* (2013.01); *G09G 2380/12* (2013.01)

(56) References Cited

U.S. PATENT DOCUMENTS

| | | | |
|---|---|---|---|
| 2017/0336631 A1* | 11/2017 | Armstrong | G02B 27/2228 |
| 2018/0194486 A1* | 7/2018 | Lux | G01C 23/005 |

OTHER PUBLICATIONS

Janin, et al., "Calibration of head-mounted displays for augmented reality applications", Proceedings of IEEE Virtual Reality Annual International Symposium, pp. 246-255, Sep. 18, 1993.

* cited by examiner

METHOD AND SYSTEM FOR
READJUSTING, VIA AN SVS SYNTHETIC
VISION SYSTEM, ON A WORN HEAD-UP
DISPLAY, A SYMBOLOGY WHICH
PERTAINS TO THE PILOTING OF AN
AIRCRAFT AND WHICH IS CONFORMAL
TO THE REAL OUTSIDE WORLD

CROSS-REFERENCE TO RELATED
APPLICATIONS

This application claims priority to foreign French patent application No. FR 1701340, filed on Dec. 21, 2017, the disclosure of which is incorporated by reference in its entirety.

FIELD OF THE INVENTION

The present invention relates to a method and system for readjusting a conformal symbology on a head-up display via an SVS synthetic vision system.

The invention pertains to the technical field of the human-system interfaces (HSIs) used in the piloting of aircraft (such as for example helicopters or aeroplanes) equipped with a head-up display system of the HWD (head-worn display) or HMD (helmet-mounted display) type, and with a DDP device for detecting cephalic posture.

BACKGROUND

Head-up display devices, whether they are worn or not, in particular allow a conformal "symbology" to be displayed on the outside world, i.e. a set of symbols the position of which in front of the eye of the pilot allows a superposition with the corresponding elements in the outside world. It may for example be a question of a speed vector, of a target on the ground or in the air, of a synthetic representation of the terrain or even of a sensor image.

This conformal display requires knowledge of the position and attitude of the aircraft and, for display devices worn on the head, the attitude of the display with respect to a fixed coordinate system linked to the aircraft. These various positions and attitudes are delivered, with respect to the aircraft, by avionic systems, and, with respect to those of the display, by the DDP posture-detecting device.

For example and in particular, the avionic systems used to deliver the position and attitude of an aircraft may respectively be:
a global positioning system (GPS), and
an inertial reference system (IRS) or an attitude and heading reference system (AHRS).

As is known, a harmonization is carried out on installation of the head-up display system, whether it be worn or not, in a cockpit, in order to calculate the angular corrections that must be made to pass from the display coordinate system to the aircraft coordinate system, and in order to obtain a conformal head-up display.

However, at the present time, certain worn head-up display devices exhibit a certain mobility between the display device or display and the worn portion of the DDP posture-detecting system, because of a mechanical non-rigidity between these two elements, i.e. the display and the worn mobile portion of the DDP, for example when there is a device for toggling the display alone out of the field of view of the operator. It is then necessary, when the display is once again toggled back into the field of view of the operator, to carry out a new harmonization in order to calculate new angular corrections to be made to the head once the head-up display is installed, and thus to make it possible to display a conformal symbology on the head-worn display device.

In order to allow and facilitate this need for relatively frequent re-harmonization, it is common to install, on board the aircraft, a dedicated instrument, called the BRU (boresight reference unit or boresight reticle unit).

The BRU, installed in the cockpit facing the head of the operator, displays a collimated symbol with a fixed orientation that is known to the head-up system.

Each time the conformal symbology must be readjusted, i.e. on each re-harmonization, the operator aligns a symbol displayed on the head-up display with the collimated symbol of the BRU.

When the symbol displayed on the head-up display, i.e. the display, is aligned with the collimated symbol, the system for harmonizing the output of the detecting device then calculates a rotation matrix from three correction angles, in order to re-harmonize the attitude of the coordinate system of the display with respect to the coordinate system of the aircraft.

The main drawback of this harmonization system based on the use of a BRU is the need to carry an additional piece of equipment dedicated to this single readjustment or harmonization function, inducing a cost in terms of installation complexity and an additional bulk and weight that may be unacceptable, in particular for small civilian aircraft. This BRU must be supplied with power through robustly installed electrical cabling. This BRU requires a harmonization procedure during its installation and introduces an additional source of error, called the harmonization error of the BRU. A risk of dealignment by movement is also possible, for example when the pilot enters or exits the cockpit or during a maintenance operation.

Furthermore, the exact orientation parameters of this BRU on the carrier, i.e. the carrying structure of the aircraft, must also be introduced into the HMD display system, and the BRU must therefore always remain perfectly fixed with respect to the carrier. However, current mechanical technologies do not allow the BRU to be mounted in the cockpit in such a way as to guarantee a zero risk of variation over time. Specifically, the vibrational environment and actions of the pilot and of maintenance operators in particular may cause slight rotations or movements of the BRU, these creating a line-of-sight error that is uncompensatable and in many cases undetectable, and therefore preventing any subsequent re-harmonization.

A first technical problem is that of providing a readjusting system and method that allows the symbology to be readjusted with the outside world when the HWD/HMD head-up display system comprises a mechanism for disengaging and re-engaging the display in the field of view of the pilot (source of misalignment) and that avoids the need to use a calibration marker installed in the cockpit and also a source of error.

A second technical problem is that of determining, with greater precision, the relative orientation between the display D0 and the device that is tightly fastened to the head/the mobile portion of the subsystem for detecting the posture of the head when the HWD/HMD head-up display system comprises a mechanism for disengaging and re-engaging the display in the field of view of the pilot.

A third technical problem is to correct the orientation of the aircraft with respect to the Earth delivered by the inertial measurement unit of the aircraft, and in particular the delivered heading, the value of which is generally not known with sufficient precision for a conformal display when this unit is an AHRS.

SUMMARY OF THE INVENTION

To this end, one subject of the invention is a method for readjusting a worn head-up display via an SVS synthetic vision system for viewing information pertaining to the piloting of an aircraft, said information being conformal with the real outside world, the readjusting method being implemented by a worn head-up display system comprising: a worn head-up display D0; a DDP subsystem for detecting cephalic posture, comprising a tracking mobile first element D1 that is tightly attached to the display D0, a fixed second element D2 that is tightly linked to the platform of the aircraft, and a means for measuring and determining the relative orientation M12 of the tracking mobile first element D1 with respect to a reference coordinate system of the fixed second element D2 linked to the platform; an inertial device D3 for delivering the relative attitude M3$t$ of the platform with respect to the Earth and a device Dp for delivering the position of the aircraft with respect to the Earth; a synthetic vision system for delivering a synthetic terrain image on the display D0, said image being dependent on and automatically controlled according to the position and relative attitude M3$t$ of the aircraft, which are measured by the inertial device and the positioning device of the aircraft, respectively, and the relative orientation M12 of the tracking mobile first element D1 with respect to the fixed second element D2 of the posture-detecting subsystem; and a dual harmonization subsystem for aligning the display D0, the DDP posture-detecting subsystem and the inertial device D3 with one another.

The readjusting method is characterized in that it comprises steps consisting in: launching the readjusting method by activating a readjusting mode at a readjusting-state start time t1c, all or some of the conformal piloting information being displayed, in a readjusting state, frozen on the display with respect to the movement of the tracking mobile element D1 and free with respect to the movement of the aircraft, and memorizing together the readjusting-state start time t1c and the corresponding relative orientation between the tracking mobile first element D1 and the fixed second element D2 of the DDP posture-detecting subsystem; then carrying out a series of a preset number N of measurements of relative orientations $\hat{K}_i$, i varying from 1 to N, of the tracking first element D1 with respect to the fixed second element D2 of the DDP posture-detecting subsystem, i.e. the element linked to the platform, these measurements corresponding to targeting actions Vi, i varying from 1 to N, during which the various elements of piloting information displayed in the readjusting state are superposed with corresponding landmarks of the real outside world; then via a dual harmonization algorithm, conjointly determining the relative orientation M01 between the display D0 and the tracking mobile element D1 and the relative orientation M3$t$ of the inertial device D3 with respect to the Earth on the basis of the rotation matrices $\hat{K}_i$ measured by the DDP subsystem, and of corresponding expected theoretical DDP rotation matrices $\hat{U}_i$, it being assumed that the relative orientation of the fixed second element D2 with respect to the inertial attitude device D3 is always equal to an identity matrix of rank 3.

According to particular embodiments, the method for readjusting the worn head-up display via an SVS synthetic vision system for viewing information pertaining to the piloting of an aircraft, said information being conformal with the real outside world, includes one or more of the following features:

the conformal piloting information is comprised in the set formed by a conformal symbology, in particular a synthetic runway, an SVS synthetic terrain representation and an image issued from an electromagnetic sensor, in particular an infrared camera;

the method for readjusting the worn head-up display furthermore comprises a step in which the harmonized right and left correction matrices M01 and M3$t$ are delivered to the SVS synthetic vision system, the readjusting mode is deactivated by the harmonization subsystem, and the SVS synthetic vision system readjusts its display by applying the readjustment correction matrices M01 and M3$t$;

the dual harmonization algorithm calculates the matrix M01 that gives the relative orientation between the display D0 and the tracking element of the DDP subsystem and the matrix M3$t$ that gives the relative orientation of the inertial attitude device D3, which is linked to the aircraft, with respect to the Earth to be the right-side rotation-correction matrix $\hat{D}$ and the left-side rotation-correction matrix $\hat{G}$, respectively, and to be conjoint solutions of the system of dual harmonization equations: $\hat{U}_i = \hat{G} \cdot \hat{K}_i \cdot \hat{D}$, i varying from 1 to N;

the minimum required number N of measurements depends on the number L of erroneous or inexploitable degrees of angular freedom of the rotations M01 and M3$t$ of the HMD display system, said number L being an integer higher than or equal to 1 and lower than or equal to 6, and the solution of the system of equations $\hat{U}_i = \hat{G} \cdot \hat{K}_i \cdot \hat{D}$, i varying from 1 to N, uses a rectification operator $\pi(.)$ that converts any given matrix A into a 3×3 square rotation matrix $\pi(A)$, which matrix $\pi(A)$, of all the 3×3 rotation matrices, is the closest in the least-squares sense to all of the terms of the matrix $\pi(A)-A$, to determine the right-side rotation matrix $\hat{D}$ and the left-side rotation matrix $\hat{G}$;

the number N is higher than or equal to 3, and the step of solving the system of dual harmonization equations comprises a first set of substeps consisting in: in a first substep, choosing a "pivot" measurement as the first measurement among the N measurements, this pivot measurement corresponding to i equal to 1, and for i=2, . . . , N the rotation matrices $\hat{U}_{1,i}$ and $\hat{K}_{1,i}$ are calculated using the equations $\hat{U}_{1,i} = \hat{U}_1^T \cdot \hat{U}_i$ and $\hat{K}_{1,i} = \hat{K}_1^T \cdot \hat{K}_i$; then in a second substep, determining for i=2, . . . , N the principle unit vectors of the rotations $\hat{U}_{1,i}$ and $\hat{K}_{1,i}$, referenced $\vec{u}_i$ and $\vec{k}_i$, respectively; then in a third substep, calculating the right matrix $\hat{D}$, i.e. M01, using the equation:

$\hat{D} = \pi(\Sigma_{i \geq 2}(\vec{k}_i \cdot \vec{u}_i^T))$; then in a fourth substep, determining the left-side rotation matrix $\hat{G}$, i.e. M3$t$, on the basis of the matrix $\hat{D}$ calculated in the third substep, using the equation: $\hat{G} = \pi(\Sigma_{i \geq 1}(\hat{U}_i \cdot \hat{D}^T \cdot \hat{K}_i^T))$;

the number of erroneous or inexploitable degrees of angular freedom of the right-side rotation $\hat{D}$, i.e. the matrix M01, is equal to 3 and the single erroneous or inexploitable degree of angular freedom of the left-side rotation $\hat{G}$, i.e. the matrix M3$t$, is the heading angle, it being assumed that the roll and pitch angles are known with a sufficient precision; and the total number N of measurements is higher than or equal 4; and the step of solving the system of dual harmonization equations comprises a first set of substeps consisting in: in a fourth substep for i=2, . . . , N, calculating the matrices $\hat{U}_{1,i}$ and the vectors $\vec{q}_i$ using the equations: $\hat{U}_{1,i} = \hat{U}_1^T \cdot \hat{U}_i$ and $\vec{q}_i = \hat{Q}_i^T \cdot \vec{k}$, the vector $\vec{k}$ being defined by the equation $$\vec{k} = \begin{pmatrix} 0 \\ 0 \\ 1 \end{pmatrix};$$

then in an initialization fifth substep, initializing a first sequence of matrices $\{\hat{D}_{[s]}\}$, [s] designating the current integer rank of advancement through the sequence $\{\hat{D}_{[s]}\}$, by setting $\hat{D}_{[0]}$ equal to $I_3$, $I_3$ being the identity matrix; then repeating an iterative sixth substep in which iteration [s+1] is passed to from iteration [s] by calculating the vector value $\vec{d}_{[s+1]}$, then the value $\hat{D}_{[s+1]}$ of the first matrix sequence $\{\hat{D}_{[s]}\}$, using the following equations:

$$\vec{d}_{[s+1]} = \frac{\sum_{i \geq 2} (\hat{U}_{1,i} \cdot \hat{D}_{[s]}^T \cdot \vec{q}_i)}{\|\sum_{i \geq 2} (\hat{U}_{1,i} \cdot \hat{D}^T \cdot \vec{q}_i)\|}$$

$$\hat{D}_{[s+1]} = \pi \left( \sum_{i \geq 2} \left( \vec{q}_i \cdot \vec{d}_{[s+1]}^T \cdot \hat{U}_{1,i} \right) \right)$$

the sequence $\{\vec{d}_{[s]}\}$ being an auxiliary second sequence of vectors and the sequence $\{\hat{D}_{[s]}\}$ converging to $\hat{D}$, and stopping in a seventh substep the iterative process carried out throughout the sixth substep when the limit $\hat{D}$ is approximated with a sufficient precision defined by a preset threshold value;
the total number N of measurements is adjusted depending on the number L of degrees of freedom to be corrected of the HMD display system and on the desired precision of the estimation of the right-side and left-side rotation matrices $\hat{D}$ and $\hat{G}$.

Another subject of the invention is a worn head-up system for displaying information pertaining to the piloting of an aircraft, said information being conformal to the real outside world and delivered via an SVS synthetic vision system, comprising: a worn head-up display D0; a DDP subsystem for detecting cephalic posture, comprising a tracking mobile first element D1 that is tightly attached to the display D0, a fixed second element D2 that is tightly linked to the platform of the aircraft, and a means for measuring and determining the relative orientation M12 of the tracking mobile first element D1 with respect to a reference coordinate system of the fixed second element D2 linked to the platform; an inertial device D3 for delivering the relative attitude M3t of the platform with respect to a terrestrial frame; a device Dp for delivering the position of the aircraft with respect to the Earth; an SVS synthetic vision system for delivering a synthetic terrain image on the display D0, said image being dependent on and automatically controlled according to the position and relative attitude M3t of the aircraft, which are measured by the inertial attitude device D3 and the positioning device of the aircraft, respectively, and the relative orientation M12 of the tracking mobile first element D1 with respect to the fixed second element D2 of the DDP posture-detecting subsystem; and a dual harmonization subsystem for aligning the display D0, the DDP posture-detecting subsystem and the inertial attitude device D3 with one another.

The worn head-up system for displaying piloting information that is conformal to the real outside terrestrial world is characterized in that:
the harmonization subsystem includes a dual harmonization processor and an HSI human-system interface incorporating a function for conformal readjustment of the head-up display; and
the dual harmonization subsystem is configured to: launch the readjusting method by activating a readjusting mode at a readjusting-state start time t1 c, all or some of the conformal piloting information being displayed, in a readjusting state, frozen on the display with respect to the movement of the tracking mobile element D1 and free with respect to the movement of the aircraft, and memorizing together the readjusting-state start time t1c and the corresponding relative orientation between the tracking mobile first element D1 and the fixed second element D2 of the DDP posture-detecting subsystem; then carry out a series of a preset number N of measurements of relative orientations $\hat{K}_i$, i varying from 1 to N, of the tracking first element D1 with respect to the fixed second element D2 of the DDP posture-detecting subsystem, i.e. the element linked to the platform, these measurements corresponding to targeting actions Vi, i varying from 1 to N, during which the various elements of piloting information displayed in the readjusting state are superposed with corresponding landmarks of the real outside world; then via a dual harmonization algorithm, conjointly determine the relative orientation M01 between the display D0 and the tracking mobile element D1 and the relative orientation M3t of the inertial device D3 with respect to the Earth on the basis of the rotation matrices $\hat{K}_i$ measured by the DDP subsystem, and of corresponding expected theoretical DDP rotation matrices $\hat{U}_i$, it being assumed that the relative orientation of the fixed second element D2 with respect to the inertial attitude device D3 is always equal to an identity matrix of rank 3.

According to particular embodiments, the worn head-up display system includes one or more of the following features:
the dual harmonization subsystem is configured to calculate the matrix M01 that gives the relative orientation between the display D0 and the tracking element of the DDP subsystem and the matrix M3t that gives the relative orientation of the inertial attitude device D3, which is linked to the aircraft, with respect to the Earth to be the right-side rotation-correction matrix $\hat{D}$ and the left-side rotation-correction matrix $\hat{G}$, respectively, and to be conjoint solutions of the system of equations: $\hat{U}_i = \hat{G} \cdot \hat{K}_i \cdot \hat{D}$, i varying from 1 to N;
the minimum required number N of measurements depends on the number L of erroneous or inexploitable degrees of angular freedom of the rotations M01 and M3t of the HMD display system, said number L being an integer higher than or equal to 1 and lower than or equal to 6; and the solution of the system of equations $\hat{U}_i = \hat{G} \cdot \hat{K}_i \cdot \hat{D}$, i varying from 1 to N, uses a rectification operator π(.) that converts any given matrix A into a 3×square rotation matrix π(A), which matrix π(A), of all the 3×3 rotation matrices, is the closest in the least-squares sense to all of the terms of the matrix π(A)−A, to determine the right-side rotation matrix $\hat{D}$ and the left-side rotation matrix $\hat{G}$;
the number N is higher than or equal to 3; and the conjoint dual harmonization processor is configured to implement a step of solving the system of dual harmonization equations by executing a first set of substeps consisting in: in a first substep, choosing a "pivot" measurement as the first measurement among the N measurements, this pivot measurement corresponding to i equal to 1, and for i=2, ..., N the rotation matrices $\hat{U}_{1,i}$ and $\hat{K}_{1,i}$ are calculated using the equations $\hat{U}_{1,i}=\hat{U}_1^T \cdot \hat{U}_i$ and $\hat{K}_{1,i}=\hat{K}_1^T \hat{K}_i$; then in a second substep, determining for i=2, ..., N the principle unit vectors of the rotations $U_{1,i}$ and $K_{1,i}$, referenced $\vec{u}_i$ and $\vec{K}_i$, respectively; then in a third substep, calculating the right matrix $\hat{D}$, i.e. M01, using the equation:

$$\hat{D}=\pi(\Sigma_{i\geq 2}(\vec{K}_i \cdot \vec{u}_i^T));$$

then in a fourth substep, determining the left-side rotation matrix $\hat{G}$, i.e. M3t, on the basis of the matrix $\hat{D}$ calculated in the third substep, using the equation:

$$\hat{G}=\pi(\Sigma_{i\geq 1}(\hat{U}_i \cdot \hat{D}^T \cdot \hat{K}_i^T));$$

the number of erroneous or inexploitable degrees of angular freedom of the right-side rotation $\hat{D}$, i.e. the matrix M01, is equal to 3 and the single erroneous or inexploitable degree of angular freedom of the left-side rotation $\hat{G}$, i.e. the matrix M3t, is the heading angle, it being assumed that the roll and pitch angles are known with a sufficient precision; and the total number N of measurements is higher than or equal 4; and the conjoint dual harmonization processor is configured to implement a step of solving the system of dual harmonization equations by executing a first set of substeps consisting in: in a fourth substep for i=2, ..., N, calculating the matrices $\hat{U}_{1,i}$ and the vectors $\vec{q}_i$ using the equations: $\hat{U}_{1,i}=\hat{U}_1^T \cdot \hat{U}_i$ and $\vec{q}_i=\hat{Q}_i^T \cdot \vec{k}$, the vector $\vec{k}$ being defined by the equation $$\vec{k}=\begin{pmatrix}0\\0\\1\end{pmatrix};$$

then in an initialization fifth substep, initializing a first sequence of matrices $\{\hat{D}_s\}$, [s] designating the current integer rank of advancement through the sequence $\{\hat{D}_s\}$, by setting $\hat{D}_{[0]}$ equal to $I_3$, $I_3$ being the identity matrix; then repeating an iterative sixth substep in which iteration [s+1] is passed to from iteration [s] by calculating the vector value $\vec{d}_{[s+1]}$, then the value $\hat{D}_{[s+1]}$ of the first matrix sequence $\{\hat{D}_{[s]}\}$, using the following equations:

$$\vec{d}_{[s+1]} = \frac{\sum_{i\geq 2}(\hat{U}_{1,i} \cdot \hat{D}_{[s]}^T \cdot \vec{q}_i)}{\|\sum_{i\geq 2}(\hat{U}_{1,i} \cdot \hat{D}^T \cdot \vec{q}_i)\|}$$

$$\hat{D}_{[s+1]} = \pi\left(\sum_{i\geq 2}\left(\vec{q}_i \cdot \vec{d}_{[s+1]}^T \cdot \hat{U}_{1,i}\right)\right)$$

the sequence $\{\vec{d}_{[s]}\}$ being an auxiliary second sequence of vectors and the sequence $\{\hat{D}_{[s]}\}$ converging to $\hat{D}$; and stopping in a seventh substep the iterative process carried out throughout the sixth substep when the limit $\hat{D}$ is approximated with a sufficient precision defined by a preset threshold value;

the dual harmonization subsystem is configured, during the implementation of the readjusting measurements, to represent the piloting information serving as target, i.e. the symbology and/or the synthetic representation of the terrain and/or the image of an electromagnetic sensor, in a representation mode specific to the measuring mode, with a distinctive colour or a distinctive line style.

BRIEF DESCRIPTION OF THE DRAWINGS

The invention will be better understood on reading the following description of a plurality of embodiments, which description is given merely by way of example and with reference to the drawings, in which.

DETAILED DESCRIPTION

The basic principle of the method according to the invention for readjusting information pertaining to the piloting of an aircraft, said information being conformal with the outside world and delivered by the SVS system, is based on:

the use of a synthetic representation of the overflown terrestrial terrain or of a symbol, which is delivered by the conformal SVS vision system, or the use of an image of an object originating from a sensor of electromagnetic radiation, for example an IR infrared camera that is fixed and that looks toward the front of the aircraft, or that is mobile and automatically controlled according to the orientation of the head of the pilot, or the use of any other conformal symbol displayed on the worn head-up display; and the ability conferred on the operator, i.e. the pilot in the case of an aircraft, to:

move and superpose the synthetic representation of the terrain delivered by the SVS or the sensor image or the conformal symbol on the corresponding element of the actual terrain seen through the head-up display, then once the superposition is obtained, store this readjustment in memory similarly to the use of a BRU, i.e. in the form of three DDP cephalic posture-detection attitude angles, but here, this time, without creating any additional error because the actual terrain is used as a fixed absolute reference; and the ability of the system for readjusting the conformal symbology to:

determine attitude corrections to be applied to the system for displaying the conformal symbology, taking the form of two (one left and the other right) rotation matrices allowing correction of the DDP detection of cephalic posture, then apply the attitude corrections to any conformal symbology.

Figure 1:
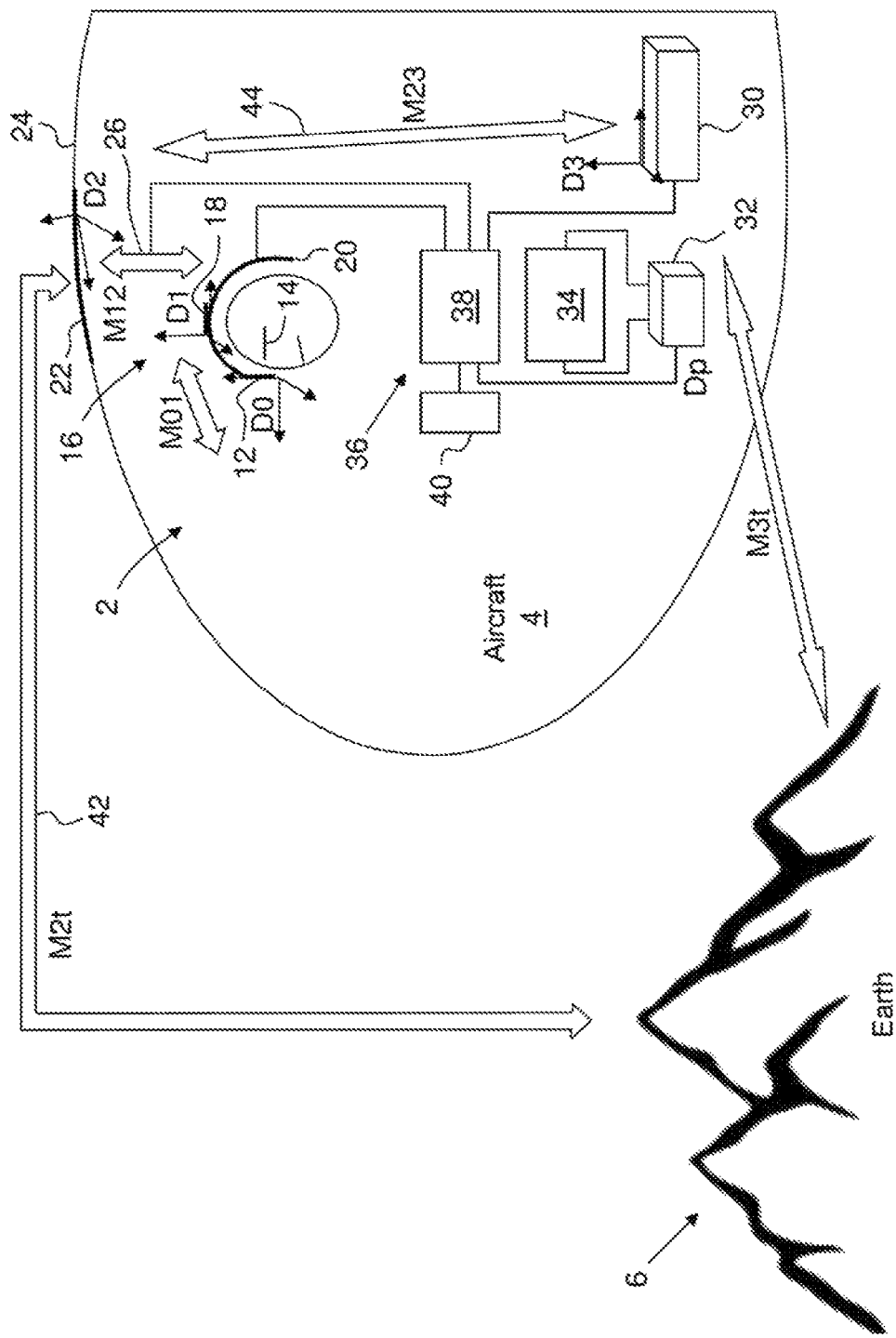
FIG. 1 is a view of a worn head-up system for displaying information pertaining to the piloting of an aircraft, said information being conformal to the real outside world and delivered via an SVS synthetic vision system, in which system a readjusting method using the SVS is implemented.

In FIG. 1, a head-up display system 2 according to the invention is configured to display information pertaining to the piloting of an aircraft 4 on a display, while making said information conformal with the real outside world 6.

The conformal piloting information for example comprises a speed vector, a target on the ground or in the air, a synthetic representation of the terrain or even a sensor image.

The worn head-up display system 2 comprises the following means and devices:

a transparent worn head-up displaying device or display 12, a lens for example, referenced D0, positioned in front of the eye 14 of a pilot and able to be used thereby as a sight;

a DDP detecting subsystem 16 for detecting posture, comprising a tracking mobile first element 18, referenced D1, which is rigidly attached to the head 19 or to the helmet 20 of the pilot and rigidly attached to the display D0 when the display D0 is placed in the field of view of the pilot, a fixed second element 22 D2, which is tightly linked to the platform 24 (also referenced "pl") of the aircraft 4 and serving as reference coordinate system with respect to the DDP posture-detecting subsystem 16, and a means 26 for measuring and determining the relative orientation M12 of the tracking mobile first element 18 D1 with respect to a reference coordinate system of the fixed second element 22 D2 linked to the platform, an inertial attitude device 30 D3, for example an AHRS inertial measurement unit, for delivering the relative attitude M3$t$ of the platform with respect to a terrestrial coordinate system "t" linked to the Earth, and which is fastened to the platform, a device 32 Dp for delivering the position of the aircraft with respect to the terrestrial coordinate system linked to the Earth, for example a GPS satellite positioning system or a radio navigation system;

an SVS synthetic vision subsystem 36 for delivering a fleet of synthesized images that are conformal with the real outside world 6, which images are seen by the pilot through the display D0 and are automatically controlled according to the variation in the orientation of the posture of the pilot's head, which is delivered by the DDP posture-detecting subsystem 16, and according to the variation in the position and attitude of the aircraft 4 with respect to the Earth, which are delivered by the positioning device Dp of the aircraft and the inertial attitude device D3, respectively;

a subsystem 38 for dually harmonizing and readjusting the symbology of the head-up display system 2 in order to make conformal and readjust the display of piloting information on the display 12 D0 with the real outside world 6, the dual harmonization and readjusting subsystem 36 comprising a dual harmonization processor 38 and a human-system interface 48, which are configured to carry out and manage the interface operations between the operator and the components of the head-up display system 2 during the implementation of the dual harmonization method and of the readjustment of the symbology.

The dual harmonization processor 36 may be an electronic processor, specifically dedicated to the implementation of the dual harmonization method, or an electronic processor of more general vocation that is provided to also implement other functions of the head-up display system 2.

Likewise, the human-system interface 38 may be a human-system interface dedicated solely to the realization of the dual harmonization method or a more general human-system interface realizing, in a shared way, other functions of the head-up display system.

The display system also includes a means 42 for defining, measuring or determining the relative angular orientation M2$t$ of the fixed second element 22 D2 with respect to the Earth, and a means 44 allowing the relative orientation M23 of the fixed second element 22 D2, which is linked to the platform 24, to be known with respect to the inertial attitude device 30 D3.

The means 44 is implemented in the form of a procedure carried out on installation of the worn head-up display system 2 and the orientation M23 is assumed to be constant over time.

The means 42 uses the data of the inertial attitude device D3, which is attached to the platform of the aircraft and configured to measure its own orientation M3$t$ with respect to the Earth, and the angular orientation M23 delivered by the means 44.

The conformal piloting information for example comprises a velocity vector, a target on the ground, a synthetic representation of the terrain or even an image of an electromagnetic sensor, for example an infrared sensor.

It will be noted that in current prior-art worn head-up display systems, DDP posture-detecting subsystems 16 may be electromagnetic or inertial, and that an inertial posture-detecting subsystem is relatively complex in practice because it implements two measurements:

an inertial measurement of the relative angular orientation M2$t$ of the fixed second element 22 D2 with respect to the Earth, and a direct measurement of the relative orientation of the tracking mobile first element 18 D1 with respect to the fixed second element 22 D2, often taking the form of image processing, and uses knowledge of the relative orientation M2$t$ of the fixed second element 22 D2 with respect to the Earth. However, this particularity makes the algorithms more complex, and this particularity has no impact on the worn head-up display system and the dual harmonization method of the present invention, and it will be possible to consider below that the relative orientation M12 of the tracking first element D1 with respect to the fixed second element D2 is simply delivered by a direct measurement of the DDP posture-detecting subsystem.

Here and according to an embodiment that is preferred below, the DDP posture-detecting subsystem 16 is configured to deliver raw DDP output data issued prioritarily from direct optical measurements of the relative orientation between the tracking first element D1 with respect to the fixed second element D2.

It will also be noted that here, for the sake of simplification, the platform and the inertial attitude device D3 are considered to be equivalent. Generally, the means 44 for delivering the relative orientation M23 is configured to perform this function in two steps: a first step of passage via the platform in which the three-axis coordinate system of the inertial attitude device D3 is "aligned" with the three-axis coordinate system of the platform, then a second step in which the orientation of the fixed second element D2 is harmonized in the coordinate system of the platform.

These observations are here without incidence on the content of the present invention.

Below, the means Mij allowing the relative orientation of a coordinate system "i" with respect to another "j" to be known are considered equivalent in the rest of this document to the matrix describing this orientation. Specifically, the orientation Mij of a coordinate system with respect to another may be described either by:

three what are called Euler angles, which conventionally, in aeronautics, correspond to the order of the rotations for the following angles:

Azimuth as regards cephalic posture or yaw as regards the aircraft: rotation about the z-axis, which is oriented downward (or toward the Earth);

Elevation as regards cephalic posture or pitch as regards the aircraft: rotation about the y-axis, which is oriented toward the right (or toward the east of the Earth);

Roll as regards cephalic posture and the aircraft: rotation about the x-axis, which is oriented frontward (or toward the north of the Earth), or by a 3×3 matrix describing this rotation.

Below, the matrix Mij will possibly also be noted M(i/j), the matrix Mij or M(i/j) describing the relative orientation of the coordinate system "i" with respect to "j" (or from "i" to "j"). If vi is the expression of a vector in the coordinate system "i" and vj is the expression of this vector in the coordinate system "j", then the following relationship is obtained: vi=M(i/j)*vj and the relationship of passage between coordinate systems: M(i/k) (from i to k)=M(j/k)*M(i/j).

The worn head-up display system 2 according to the invention is configured to implement a method for readjusting the symbology and/or a synthesized image of terrain delivered by the SVS synthetic vision subsystem, in which the symbology and/or the terrain displayed on the display are made conformal with the real outside world seen by the operator through the display, thereby allowing:

the operator of the head-up display system to carry out targeting actions with a view to superposing, on the real landscape or the real outside world, a conformal terrain image or a conformal three-dimensional symbol synthesized and delivered by the SVS synthesis subsystem, or an image issued from an electromagnetic sensor, for example an infrared sensor, displayed on the display and frozen, with respect to head movements only, from a targeting-action start time to a targeting-action end time;

for each targeting action, storing in memory the angles of orientation of the cephalic posture at the targeting-action start time and at the targeting-action end time, and calculating the rotation matrix measured between the targeting-action start time and the targeting-action end time; then conjointly calculating, using a dual harmonization algorithm, two (one left and one right) rotation matrices allowing correction of the DDP detection of cephalic posture, then applying the two attitude correction matrices to harmonize the components of the head-up display and to allow the SVS synthetic viewing system to make the symbology and the terrain conformal with the real outside world.

The calculation of the two correction rotation matrices uses the dual harmonization method described in the patent application entitled "Method and system for dual harmonization of a posture-detecting system", filed on the same date as the present application, in its first and second embodiments.

It will be noted that a plurality of readjusting levels may be defined depending on the nature of the performance of the head-up display system and the sought-after readjustment quality. Generally, a conformal display of a head-up displayed symbol with the real outside world depends generally on six angular degrees of freedom formed by three cephalic attitude angles and three aircraft attitude angles. With the method for dually harmonizing and readjusting symbology, it is ideally sought to correct the three angles giving the average M0$1$ and the three angles giving the average M3$t$, but it is not sought to correct a possible error in the position or altitude of the aircraft.

Thus, with a single cephalic attitude measurement, i.e. cephalic elevation angle, azimuth angle and roll angle, a sufficient amount of data is not acquired to correct the six sought-after angles. However, by iterating the measurements of correction angles, it is possible to acquire the sufficient number of data allowing the sought-after correction.

Thus, to correct the six angles, at least three different attitude measurements are needed, each attitude measurement including a cephalic elevation measurement, a cephalic azimuth measurement, and a cephalic roll measurement. For example, a complete readjusting procedure may be defined in which the user or pilot is asked to perform three successive measurements corresponding to a first measurement station, in which the head looks horizontally to the right of the aircraft, then a second measurement station, in which the head looks towards the centre inclined upward or downward, and lastly a third measurement station, in which the head looks horizontally to the left. The specific human-machine interface then assists the pilot with messages displayed on his head-up display in order to guide him during this procedure.

Figure 2:
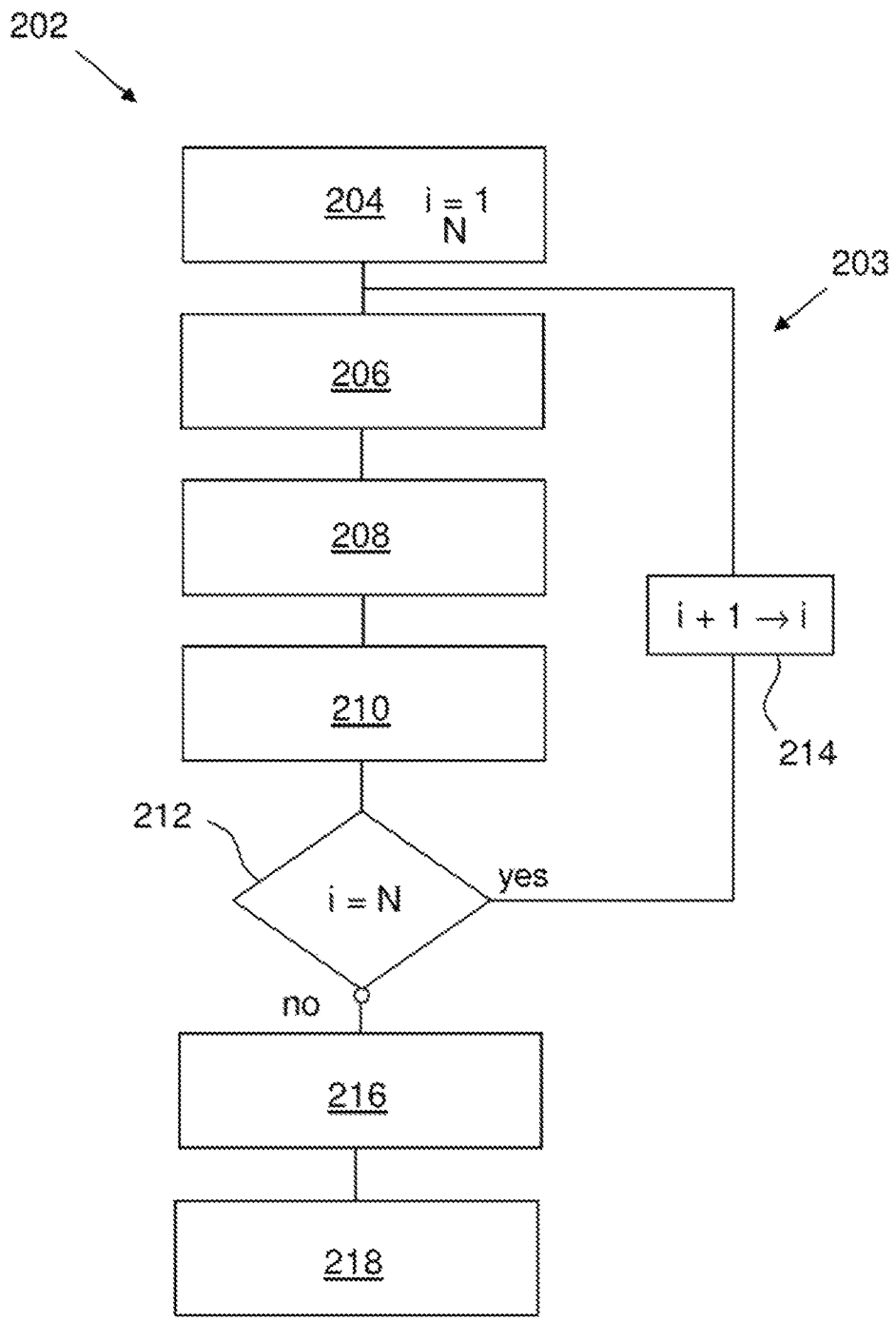
FIG. 2 is a flowchart of a method according to the invention for harmonizing the worn head-up display system of FIG. 1, and for readjusting the display of the piloting information, which information is conformal with the real outside world and delivered by the SVS synthetic vision system.
Figure 3:
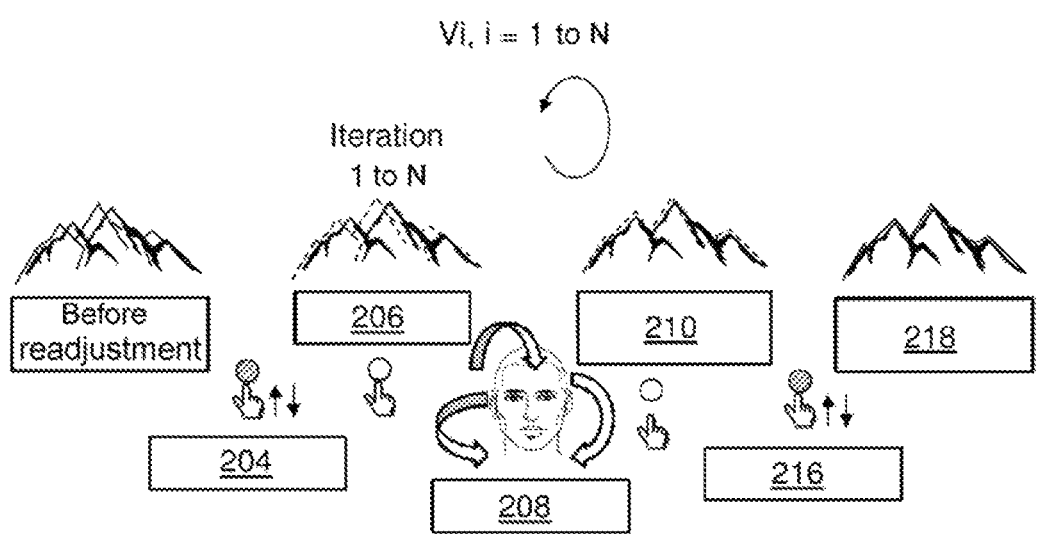
FIG. 3 is an operational view of an example of the course of the steps of the readjusting method according to the invention of FIG. 2.

In FIG. 2, a method 202 for readjusting a worn head-up display for displaying information pertaining to the piloting of an aircraft, which information is delivered by an SVS subsystem, in order to make said information conformal with the real outside world, includes a set 203 of steps.

In a launching first step 204, the procedure for readjusting conformal SVS information (terrain and/or symbol of the symbology) relating to the piloting of the aircraft is triggered at a start time t1c of the readjusting mode by the operator of the head-up display system 2, for example via a first brief press on an HSI button 40 located in the cockpit and dedicated to this trigger of the readjusting mode.

From this readjusting start time t1c, all or some of the piloting information, i.e. either a single image of the terrain viewed synthetically by the SVS, or a single image of an electromagnetic sensor, for example an infrared sensor, or a symbol representative of a particular element of the terrain, such as a runway for example, or a composite image of all the conformal SVS information (synthesized terrain and symbols) is placed in a readjusting state.

In this readjusting state, the symbols and/or the SVS synthesized terrain in question are displayed on the display, in what is called the "readjusting" display mode, depending on the movements of the aircraft and depending on fixed cephalic attitude angles (elevation, azimuth and roll), which are measured by the DDP subsystem for detecting cephalic posture at the time t1c at which the readjusting method is triggered, and which are stored in memory.

Thus, throughout the duration of the readjusting method, i.e. until the readjusting mode is exited, the symbology and the terrain synthesized by the SVS continue to be supplied with aircraft movement parameters, i.e. the position and attitude of the aircraft, and therefore to be mobile depending on the movements of the aircraft.

Optionally, the symbols in question may change their representational aspect in order to symbolize the readjusting state, for example via a change of colour, line style (for example dotted line instead of solid line), mode of representation of the SVS terrain (wireframe for outlines, solid for area elements).

In the launching first step 204, a measurement mode is actuated in which a counter of advancement through a series of a preset integer number N of measurements or targeting actions Vi sets an index i of advancement through the measurements equal to 1.

Next, in a second step 206, the human-system interface HSI 40 invites the operator to perform the current measurement "i" of rank i. The operator starts and triggers the measurement of rank i, for example via a sustained press on a button, dedicated to the measurement, which will cease only on validation of the current targeting action Vi.

Once the measurement has been triggered, the press on the measurement button being sustained, in a measuring third step 208, the operator superposes a different element of piloting information, which information is frozen on the display with respect to the movements of the tracking first element 18 D1, on the corresponding landmark of the real outside world.

For example, the superposition will be a superposition of the image of a section of the SVS synthesized terrain on the actual terrain, a superposition of the image of an infrared IR sensor on the actual terrain, or a superposition of the image of a runway or helipad symbol on the corresponding real element, achieved by making slight head movements.

Next, when the superposition of the image on the landscape element has been obtained, in a fourth step 210 of validation of the current measurement, the current measurement Vi of rank i is validated, here on the release of the press of the button, and the three DDP cephalic-posture-detection angles, i.e. an elevation angle, an azimuth angle and a roll angle, corresponding to the attitude of the head of the operator during this targeting action Vi are stored in memory.

Next, in a testing fifth step 212, it is checked whether the number N of sought-after measurements has been reached.

Provided that the number N has not been reached, the readjusting mode remaining activated, the second, third and fourth steps 206, 208, 210 are reiterated, on having incremented beforehand, in a sixth step 214, by one unit the present advancement index i of the "i" counter.

When the total number N of desired measurements has been reached, in a seventh step 216, the symbology and terrain elements of the SVS, placed in a readjusting state in the first step 204, are deactivated from this readjusting state at a readjusting-state end time t2c, and put back in a conformity-tracking state dependent on head movements and on aircraft movements.

In the same seventh step 216, a dual harmonization of the head-up display system is carried out in which the relative orientation M01 between the display 12 D0 and the tracking mobile element 18 D1 and the relative orientation M3t of the inertial device D3 with respect to the Earth are determined conjointly on the basis of the rotation matrices $\hat{K}_i$ measured by the DDP subsystem between the readjusting-state start time t1c and the readjusting-state end time, and of corresponding expected theoretical DDP rotation matrices $\hat{U}_i$, it being assumed that the relative orientation of the fixed second element D2 with respect to the inertial attitude device D3 is always equal to an identity matrix of rank 3.

As a variant, when, by design, the worn head-up display system requires a plurality of measurements for a satisfactory correction, messages or a specific symbology may be displayed on the screen of the HSI interface of the readjusting system in order to invite the user to reiterate the readjustment while looking in another direction, and the correction matrices M01 and M3t may be calculated after the last iteration.

It will be noted that when an image of a sensor, for example an infrared camera, that is fixed with respect to the aircraft is used, the axis of the sensor being considered to be known and invariable, the solution described here only corrects DDP posture-detection errors, i.e. the rotation matrix M01, but not errors in the attitude of the aircraft, i.e. the rotation matrix M3t, and this has the advantage of decreasing the number of measurements required.

It is recommended to carry out this harmonization procedure on the ground, or, if it proves to be necessary in flight, during a flight phase that is not very dynamic, and ideally when the aircraft is flying horizontally in a straight line, in order to optimize the effectiveness of the calculations.

Next, in an eighth step 218, the new corrected rotation matrices M01 and M3t are applied to all of the conformal piloting information (SVS terrain images and symbology) until a subsequent readjusting operation.

In a first embodiment of the readjusting method and a first configuration of the HMD display system, a series of an integer number N, N higher than or equal to 3, of measurements, which are identified by the index "i", "i" varying from 1 to N, are carried out while assuming that the three degrees of angular freedom corresponding to the right-side correction matrix M01 of the cephalic attitude measurements delivered by the DDP posture-detecting subsystem are all erroneous in a way that does not vary over time and that the three degrees of freedom of the attitude of the aircraft, which are delivered by the inertial device D3 and which correspond to the left-side correction matrix M3t of the cephalic attitude measurements, which are delivered by the DDP posture-detecting subsystem, are all erroneous in a way that does not vary over time.

Figure 4:
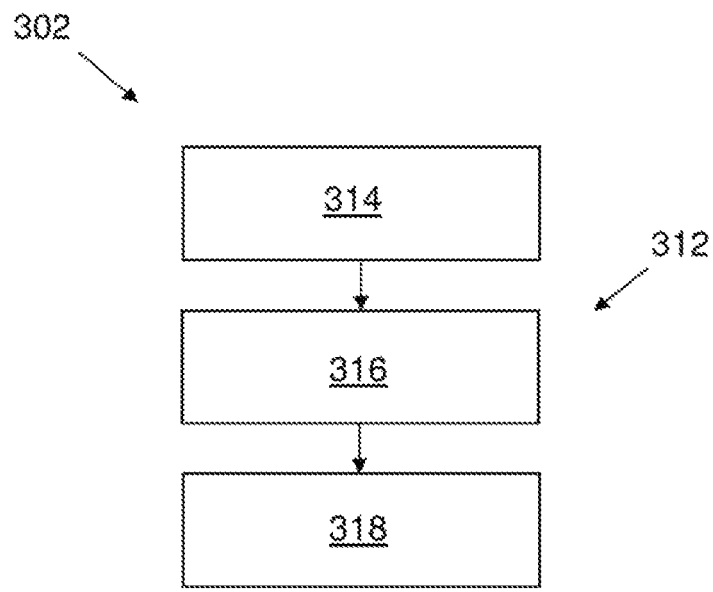
FIG. 4 is a detailed flowchart of a first embodiment of the step of solving the system of dual harmonization equations of the readjusting method of FIG. 2.

In this first particular embodiment and in FIG. 4, the seventh step is referenced by the reference number 302.

In this seventh step 302, the harmonization processor solves the following system of dual harmonization equations: $\hat{U}_i = \hat{G} \cdot \hat{K}_i \cdot \hat{D}$, i varying from 1 to N, in which:

the matrix $\hat{G}$ is the left-side correction matrix, i.e. none other than the passage matrix M3t that is sought here;

the matrices $\hat{K}_i$, i varying from 1 to N, are the corresponding matrices of measurements and rotations for each measurement identified by the advancement index at the cephalic attitude angles delivered by the DDP posture-detecting subsystem;

the right-side correction matrix $\hat{D}$ is the matrix M01 that is sought here, i.e. that allows passage from the coordinate system of the display to the tracking mobile first element D1 of the DDP posture-detecting subsystem;

the matrices $\hat{U}_i$, varying from 1 to N, are the corresponding expected or theoretical useful posture-detection matrices for each measurement identified by the advancement index "i".

To solve the harmonization equation, the seventh step 302 uses the algorithm of the first configuration, which algorithm is described in the French patent application entitled "Procédé et système d'harmonisation duale et conjointe d'un système de détection de posture" and filed on the same date as the present French patent application. The seventh step 302 implements a first set 312 of first, second and third substeps 314, 316, 318.

In a first substep 314, a "pivot" measurement is chosen, for example the first measurement corresponding to i equal to 1.

It is then possible to verify that for i=2, . . . , N: $\hat{U}_1^T \cdot \hat{U}_i = \hat{D}^T \cdot \hat{K}_1^T \cdot \hat{K}_i \cdot \hat{D}$.

Thus, noting $\hat{U}_{1,i} = \hat{U}_1^T \cdot \hat{U}_i$ and $\hat{K}_{1,i} = \hat{K}_1^T \cdot \hat{K}_i$, it is possible to write: $\hat{D} \cdot \hat{U}_{1,i} = \hat{K}_{1,i} \cdot \hat{D}$.

In the first substep 314, the rotation matrices $\hat{U}_{1,i}$ and $\hat{K}_{1,i}$ are thus calculated for i=2, . . . , N using the equations: $\hat{U}_{1,i} = \hat{U}_1^T \cdot \hat{U}_i$ and $\hat{K}_{1,i} = \hat{K}_1^T \cdot \hat{K}_i$.

Next, in a second substep 316, the reduction of the system of equations: $\hat{U}_i = \hat{G} \cdot \hat{K}_i \cdot \hat{D}$, i varying from 1 to N, is completed using the fact that the latter equations are mathematically equivalent to: $\hat{D} \cdot \vec{u}_i = \vec{k}_i$, where $\vec{u}_i$ and $\vec{k}_i$ are respectively the principal unit vectors of the rotations $\hat{U}_{1,i}$ and $\hat{K}_{1,i}$.

Thus, in the second substep 316, the principal unit vectors of the rotations $\hat{U}_{1,i}$ and $\hat{K}_{1,i}$, which vectors are designated $\vec{u}_i$ and $\vec{k}_i$, respectively, are determined in a known way for $i=2, \ldots, N$.

Next, in a third substep 318, the right matrix $\hat{D}$ or M01 is calculated using the equation:

$$\hat{D} = \pi\left(\sum_{i \geq 2} \left(\vec{k}_i \cdot \vec{u}_i^T\right)\right)$$

in which $\pi(.)$ is a rectification or projection operator that converts any given matrix A into a 3×3 square rotation matrix $\pi(A)$ that is, of all 3×3 rotation matrices, the closest, in the least-squares sense, to all of the terms of the matrix $\pi(A)-A$.

Next, in a fourth substep 320, the left-side rotation matrix $\hat{G}$ or M3t is determined on the basis of the matrix $\hat{D}$, which was calculated in the third substep 318, using the equation:

$$\hat{G} = \pi\left(\sum_{i \geq 1} \left(\hat{U}_i \cdot \hat{D}^T \cdot \hat{K}_i^T\right)\right)$$

It will be noted that mathematical study of the projection $\pi$ shows that the choice of the pivot among the N measurements is without influence on the final result of the harmonization.

It will also be noted that mathematical study of the projection $\pi$ shows that the choice as to whether to determine $\hat{D}$ or $\hat{G}$ first is also without influence; it is possible to start by eliminating $\hat{D}$ by making $\hat{U}_i \cdot \hat{U}_1^T = \hat{G} \cdot \hat{K}_i \cdot \hat{K}_1^T \cdot \hat{G}^T$ and to likewise solve.

This first configuration, which is able to correct up to six degrees of freedom, requires, by way of operating constraints, the minimum number N of measurements to be higher than or equal to 3, and the axes of the rotations $\hat{U}_i$ to be distinct for at least three different index values "i".

This first embodiment of the readjusting method is neither necessary nor truly useful in the case of other configurations of the display system, i.e. configurations in which the number of erroneous angular degrees of freedom is strictly lower than 6 and higher than or equal to 1.

Specifically, the pitch and roll angles of the aircraft, which are delivered by the inertial attitude device linked to the platform of the aircraft, are generally most often known with a sufficient precision for a conformal display. In contrast, the yaw angle of the aircraft, corresponding to the heading of the aircraft, is generally known with a lower precision, in particular in small civilian craft that do not possess a precise inertial measurement unit. It is therefore only of interest to correct this heading angle. As for the error in the orientation of the display with respect to the DDP elements fastened to the worn head-up equipment and serving for posture detection, the angles of freedom may be limited to two or even to a single angle, for example if the mechanism allowing the display to be moved out of the field of view of its user consists of a pivot about a single axis. In this case, a readjusting procedure simplified to a single targeting action may allow the errors of the system to be corrected and suffice to obtain a sufficient conformity of the symbology viewed via the head-up display with a procedure that is easy for the user to implement.

In a second embodiment of the readjusting method and a first configuration of the HMD display system, a series of an integer number N, N higher than or equal to 4, of measurements, which are identified by the index "i", "i" varying from 1 to N, are carried out while assuming that the three degrees of angular freedom corresponding to the right-side correction matrix M01 of the cephalic attitude measurements delivered by the DDP posture-detecting subsystem are all erroneous in a way that does not vary over time and that a single degree of freedom, the degree of freedom of the heading angle, among the attitude angles of the aircraft, which are delivered by the inertial device D3 and which correspond to the left-side correction matrix M3t of the cephalic attitude measurements, which are delivered by the DDP posture-detecting subsystem, is erroneous in a way that does not vary over time.

Figure 5:
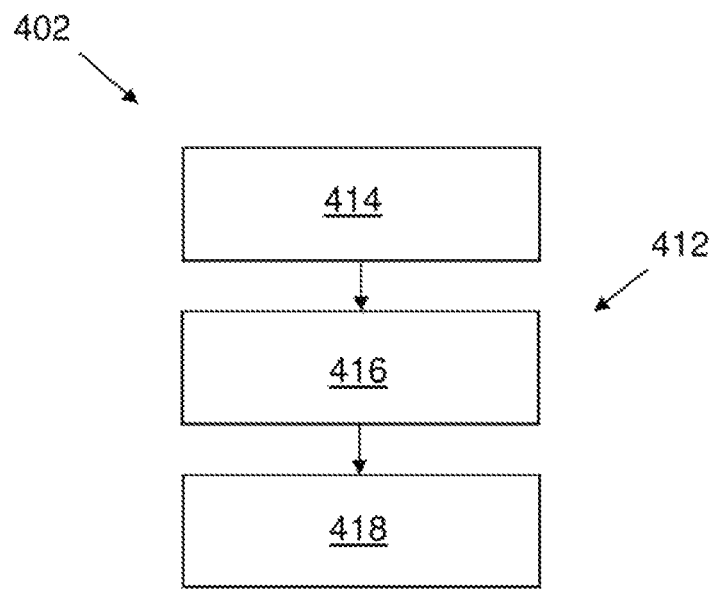
FIG. 5 is a detailed flowchart of a second embodiment of the step of solving the system of dual harmonization equations of the readjusting method of FIG. 2.

In this second particular embodiment and in FIG. 5, the seventh step is referenced by the reference number 402.

In this seventh step 402, the harmonization processor again solves the following system of dual harmonization equations: $\hat{U}_i = \hat{G} \cdot \hat{K}_i \cdot \hat{D}$, i varying from 1 to N, but here, this time while assuming that only the azimuth value of the calculated DDP matrices $\hat{K}_i$ is inexact or not calculated, or in any case inexploitable.

This poor knowledge of the azimuth value is expressed mathematically by writing, in the first step, that, for any i, varying from 1 to N, the matrix $\hat{K}_i$ may be decomposed as follows: $\hat{K}_i = \hat{\psi}_i \cdot \hat{Q}_i$, where $\hat{\psi}_i$ is an unknown rotation matrix of elementary azimuthal form:

$$\begin{pmatrix} \cos\psi i & -\sin\psi i & 0 \\ \sin\psi i & \cos\psi i & 0 \\ 0 & 0 & 1 \end{pmatrix};$$

and $\hat{Q}_i$ is a known rotation matrix.

Thus, the general starting equations $\hat{U}_i = \hat{G} \cdot \hat{K}_i \cdot \hat{D}$, i varying from 1 to N, become: $\hat{U}_i = \hat{G} \cdot \hat{\psi}_i \cdot \hat{Q}_i \cdot \hat{D}$ for i varying from 1 to N.

To solve the system of the harmonization equations $\hat{U}_i = \hat{G} \cdot \hat{\psi}_i \cdot \hat{Q}_i \cdot \hat{D}$ for i varying from 1 to N, the seventh step 402 uses the algorithm of the second configuration, which algorithm is described in the French patent application entitled "Procédé d'harmonisation duale d'un sous-système de détection de posture DDP intégré dans un système de visualisation tête haute porté" and filed on the same date as the present French patent application. The seventh step 402 implements a first set 412 of fourth, fifth and sixth substeps 414, 416, 418.

In the fourth substep 414, for $i=2, \ldots, N$, the matrices $\hat{U}_{1,i}$ and the vectors $\vec{q}_i$ are calculated using the following equations:

$$\hat{U}_{1,i} = \hat{U}_1^T \cdot \hat{U}_i \text{ and } \vec{q}_i = \hat{Q}_i^T \cdot \vec{k},$$

the vector $\vec{k}$ being defined by the equation $$\vec{k} = \begin{pmatrix} 0 \\ 0 \\ 1 \end{pmatrix}.$$

Next, in an initialization fifth substep 416, a first sequence of matrices $\{\hat{D}_{[s]}\}$, [s] designating the current index of advancement through the sequence $\hat{D}_{[s]}$, is initialized by setting $\hat{D}_{[s]}$ equal to $I_3$, $I_3$ being the identity matrix.

Next, an iterative sixth substep 418 is repeated, in which substep iteration [s+1] is passed to from iteration [s] by calculating the vector value $\vec{d}_{[s+1]}$, then the value $\hat{D}_{[s+1]}$ of the first matrix sequence $\{\hat{D}_{[s]}\}$, using the following equations:

$$\vec{d}_{[s+1]} = \frac{\sum_{i\geq 2}(\hat{U}_{1,i} \cdot \hat{D}_{[s]}^T \cdot \vec{q}_i)}{\left\|\sum_{i\geq 2}(\hat{U}_{1,i} \cdot \hat{D}^T \cdot \vec{q}_i)\right\|}$$

$$\hat{D}_{[s+1]} = \pi\left(\sum_{i\geq 2}\left(\vec{q}_i \cdot \vec{d}_{[s+1]}^T \cdot \hat{U}_{1,i}\right)\right)$$

the sequence $\{\vec{d}_{[s]}\}$ being an auxiliary second sequence of vectors and the sequence $\{\hat{D}_{[s]}\}$ converging to $\hat{D}$.

Next, $\hat{D}$ is calculated as a limit or an approximate limit of the sequence $\hat{D}_{[s]}$, which is convergent, the iterative process carried out throughout the sixth substep being stopped, in a seventh substep 420, when the limit $\hat{D}$ is approximated with a sufficient precision defined by a preset threshold value.

Similarly, the calculating seventh step 402 is applied to determine the matrix $\hat{G}$, by creating to begin with a pivot on the right in the system of equations $\hat{U}_i = \hat{G} \cdot \hat{\psi}_i \cdot \hat{Q}_i \cdot \hat{D}$ for i varying from 1 to N.

This second configuration requires, by way of operating constraints, the minimum number N of measurements to be higher than or equal to 4, and the axes of the rotations $\hat{U}_i$ to be distinct for at least three different values of the index "i".

Apart from the saving of one instrument, the BRU, the method and system for readjusting symbology according to the invention have an enhanced correction performance that also encompasses aircraft attitude errors. Specifically, the use by the readjusting method of an outside reference instead of a reference inside the cockpit allows residual errors in the pitch and roll values and most particularly in the heading value of the aircraft to be corrected. This advantage is very important, in particular for small civilian aircraft in which the heading angle is the value known with the least precision on account of the fact that said small civilian aircraft do not possess a truly precise AHRS or inertial measurement unit.

The invention claimed is:

1. A method for readjusting a worn head-up display via an SVS synthetic vision system for viewing information pertaining to the piloting of an aircraft, said information being conformal with the real outside world,
   the readjusting method being implemented by a worn head-up display system comprising:
   a worn head-up display D0,
   a DDP subsystem for detecting cephalic posture, comprising a tracking mobile first element D1 that is tightly attached to the display D0, a fixed second element D2 that is tightly linked to the platform of the aircraft, and a means for measuring and determining the relative orientation M12 of the tracking mobile first element D1 with respect to a reference coordinate system of the fixed second element D2 linked to the platform,
   an inertial device D3 for delivering the relative attitude M3t of the platform with respect to the Earth and a device Dp for delivering the position of the aircraft with respect to the Earth,
   a synthetic vision system for delivering a synthetic terrain image on the display D0, said image being dependent on and automatically controlled according to:
      the position and relative attitude M3t of the aircraft, which are measured by the positioning device of the aircraft and the inertial device, respectively, and
      the relative orientation M12 of the tracking mobile first element D1 with respect to the fixed second element D2 of the posture-detecting subsystem; and
   a dual harmonization subsystem for aligning the display D0, the DDP posture-detecting subsystem and the inertial device D3 with one another,
   the readjusting method being wherein it comprises steps consisting in:
   launching the readjusting method by activating a readjusting mode at a readjusting-state start time t1c, all or some of the conformal piloting information being displayed, in a readjusting state, frozen on the display with respect to the movement of the tracking mobile element D1 and free with respect to the movement of the aircraft, and memorizing together the readjusting-state start time t1c and the corresponding relative orientation between the tracking mobile first element D1 and the fixed second element D2 of the DDP posture-detecting subsystem; then
   carrying out a series of a preset number N of measurements of relative orientations $\hat{K}_j$, i varying from 1 to N, of the tracking first element D1 with respect to the fixed second element D2 of the DDP posture-detecting subsystem, i.e. the element linked to the platform, these measurements corresponding to targeting actions Vi, i varying from 1 to N, during which the various elements of piloting information displayed in the readjusting state are superposed with corresponding landmarks of the real outside world; then
   via a dual harmonization algorithm, conjointly determining the relative orientation M01 between the display D0 and the tracking mobile element D1 and the relative orientation M3t of the inertial device D3 with respect to the Earth on the basis of the rotation matrices $\hat{K}_j$ measured by the DDP subsystem, and of corresponding expected theoretical DDP rotation matrices $\hat{U}_j$, it being assumed that the relative orientation of the fixed second element D2 with respect to the inertial attitude device D3 is always equal to an identity matrix of rank 3.

2. The method for readjusting a worn head-up display via an SVS synthetic vision system for viewing information pertaining to the piloting of an aircraft, said information being conformal with the real outside world, according to claim 1, wherein
   the conformal piloting information is comprised in the set formed by a conformal symbology, in particular a synthetic runway, an SVS synthetic terrain representation and an image issued from an electromagnetic sensor, in particular an infrared camera.

3. The method for readjusting a worn head-up display via an SVS synthetic vision system for viewing information pertaining to the piloting of an aircraft, said information being conformal with the real outside world, according to claim 1, furthermore comprising:
   a step in which the harmonized right and left correction matrices M01 and M3t are delivered to the SVS synthetic vision system, the readjusting mode is deactivated by the harmonization subsystem, and the SVS synthetic vision system readjusts its display by applying the readjustment correction matrices M01 and M3t.

4. The method for readjusting a worn head-up display via an SVS synthetic vision system for viewing information pertaining to the piloting of an aircraft, said information being conformal with the real outside world, according to claim 1, wherein the dual harmonization algorithm calculates the matrix M01 that gives the relative orientation between the display D0 and the tracking element of the DDP subsystem and the matrix M3$t$ that gives the relative orientation of the inertial attitude device D3, which is linked to the aircraft, with respect to the Earth to be the right-side rotation-correction matrix $\hat{D}$ and the left-side rotation-correction matrix $\hat{G}$, respectively, and to be conjoint solutions of the system of dual harmonization equations: $\hat{U}_i = \hat{G} \cdot \hat{K}_i \cdot \hat{D}$, i varying from 1 to N.

5. The method for readjusting a worn head-up display via an SVS synthetic vision system for viewing information pertaining to the piloting of an aircraft, said information being conformal with the real outside world, according to claim 4, wherein the minimum required number N of measurements depends on the number L of erroneous or inexploitable degrees of angular freedom of the rotations M01 and M3$t$ of the display system, said number L being an integer higher than or equal to 1 and lower than or equal to 6, and the solution of the system of equations $\hat{U}_i = \hat{G} \cdot \hat{K}_i \cdot \hat{D}$, i varying from 1 to N, uses a rectification operator $\pi(.)$ that converts any given matrix A into a 3×3 square rotation matrix $\pi(A)$, which matrix $\pi(A)$, of all the 3×3 rotation matrices, is the closest in the least-squares sense to all of the terms of the matrix $\pi(A)-A$, to determine the right-side rotation matrix $\hat{D}$ and the left-side rotation matrix $\hat{G}$.

6. The method for readjusting a worn head-up display via an SVS synthetic vision system for viewing information pertaining to the piloting of an aircraft, said information being conformal with the real outside world, according to claim 5, wherein the number N is higher than or equal to 3, the step of solving the system of dual harmonization equations comprises a first set of substeps consisting in:

in a first substep, choosing a "pivot" measurement as the first measurement among the N measurements, this pivot measurement corresponding to i equal to 1, and for i=2, . . . , N the rotation matrices $\hat{U}_{1,i}$ and $\hat{K}_{1,i}$ are calculated using the equations $\hat{U}_{1,i} = \hat{U}_1^T \cdot \hat{U}_i$ and $\hat{K}_{1,i}^T = \hat{K}_1^T \cdot \hat{K}_i$; then in a second substep, determining for i=2, . . . , N the principle unit vectors of the rotations $\hat{U}_{1,i}$ and $\hat{K}_{1,i}$, referenced $\vec{u}_i$ and $\vec{K}_i$, respectively; then in a third substep, calculating the right matrix $\hat{D}$, i.e. M01, using the equation:

$$\hat{D} = \pi\left(\sum\nolimits_{i\geq 2}\left(\vec{k}_i \cdot \vec{u}_i^T\right)\right)$$

then in a fourth substep, determining the left-side rotation matrix $\hat{G}$, i.e. M3$t$, on the basis of the matrix $\hat{D}$ calculated in the third substep, using the equation:

$$\hat{G} = \pi\left(\sum\nolimits_{i\geq 1}\left(\hat{U}_i \cdot \hat{D}^T \cdot \hat{K}_i^T\right)\right)$$

7. The method for readjusting a worn head-up display via an SVS synthetic vision system for viewing information pertaining to the piloting of an aircraft, said information being conformal with the real outside world, according to claim 4, wherein the number of erroneous or inexploitable degrees of angular freedom of the right-side rotation $\hat{D}$, i.e. the matrix M01, is equal to 3 and the single erroneous or inexploitable degree of angular freedom of the left-side rotation $\hat{G}$, i.e. the matrix M3$t$, is the heading angle, it being assumed that the roll and pitch angles are known with a sufficient precision; and the total number N of measurements is higher than or equal 4, and the step of solving the system of dual harmonization equations comprises a first set of substeps consisting in in a fourth substep for i=2,,N, calculating the matrices $\hat{U}_{1,i}$ and the vectors $\vec{q}_i$ using the equations:

$$\hat{U}_{1,i} = \hat{U}_1^T \cdot \hat{U}_i \text{ and } \vec{q}_i = \hat{Q}_i^T \cdot \vec{k},$$

the vector $\vec{k}$ being defined by the equation $$\vec{k} = \begin{pmatrix} 0 \\ 0 \\ 1 \end{pmatrix};$$

then in an initialization fifth substep, initializing a first sequence of matrices $\{\hat{D}_{[s]}\}$, [s] designating the current integer rank of advancement through the sequence $\{\hat{D}_{[s]}\}$, by setting $\hat{D}_{[0]}$ equal to $I_3$, $I_3$ being the identity matrix; then repeating an iterative sixth substep in which iteration [s+1] is passed to from iteration [s] by calculating the vector value $\vec{d}_{[s+1]}$, then the value $\hat{D}_{[s+1]}$ of the first matrix sequence $\{\hat{D}_{[s]}\}$, using the following equations:

$$\vec{d}_{[s+1]} = \frac{\sum_{i\geq 2}\left(\hat{U}_{1,i} \cdot \hat{D}_{[s]}^T \cdot \vec{q}_i\right)}{\left\|\sum_{i\geq 2}\left(\hat{U}_{1,i} \cdot \hat{D}^T \cdot \vec{q}_i\right)\right\|}$$

$$\hat{D}_{[s+1]} = \pi\left(\sum\nolimits_{i\geq 2}\left(\vec{q}_i \cdot \vec{d}_{[s+1]}^T \cdot \hat{U}_{1,i}\right)\right)$$

the sequence $\{d_{[s]}\}$ being an auxiliary second sequence of vectors and the sequence $\{\hat{D}_{[s]}\}$ converging to $\hat{D}$;

stopping in a seventh substep the iterative process carried out throughout the sixth substep when the limit $\hat{D}$ is approximated with a sufficient precision defined by a preset threshold value.

8. The method for readjusting a worn head-up display via an SVS synthetic vision system for viewing information pertaining to the piloting of an aircraft, said information being conformal with the real outside world, according to claim 1, wherein the total number N of measurements is adjusted depending on the number L of degrees of freedom to be corrected of the display system and on the desired precision of the estimation of the right-side and left-side rotation matrices $\hat{D}$ and $\hat{G}$.

9. A worn head-up system for displaying information pertaining to the piloting of an aircraft, said information being conformal to the real outside world and delivered via an SVS synthetic vision system, comprising:
- a worn head-up display D0, and
- a DDP subsystem for detecting cephalic posture, comprising a tracking mobile first element D1 that is tightly attached to the display D0, a fixed second element D2 that is tightly linked to the platform of the aircraft, and a means for measuring and determining the relative orientation M12 of the tracking mobile first element D1 with respect to a reference coordinate system of the fixed second element D2 linked to the platform, and
- an inertial device D3 for delivering the relative attitude M3t of the platform with respect to a terrestrial frame,
- a device Dp for delivering the position of the aircraft with respect to the Earth, and
- an SVS synthetic vision system for delivering a synthetic terrain image on the display D0, said image being dependent on and automatically controlled according to:
- the position and relative attitude M3t of the aircraft, which are measured by the positioning device of the aircraft and the inertial attitude device D3, respectively, and
- the relative orientation M12 of the tracking mobile first element D1 with respect to the fixed second element D2 of the DDP posture-detecting subsystem; and
- a dual harmonization subsystem for aligning the display D0, the DDP posture-detecting subsystem and the inertial attitude device D3 with one another,
- the worn head-up system for displaying piloting information that is conformal to the real outside terrestrial world being wherein:
- the harmonization subsystem includes a dual harmonization processor and an HSI human-system interface incorporating a function for readjustment of the conformal head-up display; and
- the dual harmonization subsystem is configured to:
- launch the readjusting method by activating a readjusting mode at a readjusting-state start time t1c, all or some of the conformal piloting information being displayed, in a readjusting state, frozen on the display with respect to the movement of the tracking mobile element D1 and free with respect to the movement of the aircraft, and memorizing together the readjusting-state start time t1c and the corresponding relative orientation between the tracking mobile first element D1 and the fixed second element D2 of the DDP posture-detecting subsystem; then
- carry out a series of a preset number N of measurements of relative orientations $\hat{K}_i$, varying from 1 to N, of the tracking first element D1 with respect to the fixed second element D2 of the DDP posture-detecting subsystem, i.e. the element linked to the platform, these measurements corresponding to targeting actions Vi, i varying from 1 to N, during which the various elements of piloting information displayed in the readjusting state are superposed with corresponding landmarks of the real outside world; then
- via a dual harmonization algorithm, conjointly determine the relative orientation M01 between the display D0 and the tracking mobile element D1 and the relative orientation M3t of the inertial device D3 with respect to the Earth on the basis of the rotation matrices $\hat{K}_i$ measured by the DDP subsystem, and of corresponding expected theoretical DDP rotation matrices $\hat{U}_i$, it being assumed that the relative orientation of the fixed second element D2 with respect to the inertial attitude device D3 is always equal to an identity matrix of rank 3.

10. The worn head-up system for displaying information pertaining to the piloting of an aircraft, said information being conformal to the real outside world and delivered via an SVS synthetic vision system, according to claim 9, wherein
the harmonization subsystem is configured to calculate the matrix M01 that gives the relative orientation between the display D0 and the tracking element of the DDP subsystem and the matrix M3t that gives the relative orientation of the inertial attitude device D3, which is linked to the aircraft, with respect to the Earth to be the right-side rotation-correction matrix $\hat{D}$ and the left-side rotation-correction matrix $\hat{G}$, respectively, and to be conjoint solutions of the system of equations:
$\hat{U}_i = \hat{G} \cdot \hat{K}_i \cdot \hat{D}$, i varying from 1 to N.

11. The worn head-up system for displaying information pertaining to the piloting of an aircraft, said information being conformal to the real outside world and delivered via an SVS synthetic vision system, according to claim 10, wherein
the minimum required number N of measurements depends on the number L of erroneous or inexploitable degrees of angular freedom of the rotations M01 and M3t of the display system, said number being an integer higher than or equal to 1 and lower than or equal to 6, and
the solution of the system of equations $\hat{U}_i = \hat{G} \cdot \hat{K}_i \cdot \hat{D}$, i varying from 1 to N, uses a rectification operator $\pi(.)$ that converts any given matrix A into a 3×3 square rotation matrix $\pi(A)$, which matrix $\pi(A)$, of all the 3×3 rotation matrices, is the closest in the least-squares sense to all of the terms of the matrix $\pi(A) - A$, to determine the right-side rotation matrix $\hat{D}$ and the left-side rotation matrix $\hat{G}$.

12. The worn head-up system for displaying information pertaining to the piloting of an aircraft, said information being conformal to the real outside world and delivered via an SVS synthetic vision system, according to claim 11, wherein
the number N is higher than or equal to 3, and
the dual harmonization processor is configured to implement a step of solving the system of dual harmonization equations by executing a first set of substeps consisting in:
in a first substep, choosing a "pivot" measurement as the first measurement among the N measurements, this pivot measurement corresponding to i equal to 1, and for i=2, . . . , N the rotation matrices $\hat{U}_{1,i}$ and $\hat{K}_{1,i}$ are calculated using the equations $\hat{U}_{1,i} = \hat{U}_1^T \cdot \hat{U}_i$ and $\hat{K}_{1,i} = \hat{K}_1^T \cdot \hat{K}_i$; then
in a second substep, determining for i=2, . . . , N the principle unit vectors of the rotations $\hat{U}_{1,i}$ and $\hat{K}_{1,i}$, referenced $\vec{u}_i$ and $\vec{k}_i$, respectively; then
in a third substep, calculating the right matrix $\hat{D}$, i.e. M01, using the equation:

$$\hat{D} = \pi\left(\sum_{i \geq 2} \left(\vec{k}_i \cdot \vec{u}_i^T\right)\right)$$

then
in a fourth substep, determining the left-side rotation matrix $\hat{G}$, i.e. M3t, on the basis of the matrix $\hat{D}$ calculated in the third substep, using the equation:

$$\hat{G} = \pi\left(\sum_{i \geq 1} \left(\hat{U}_i \cdot \hat{D}^T \cdot \hat{k}_i^T\right)\right)$$

13. The worn head-up system for displaying information pertaining to the piloting of an aircraft, said information being conformal to the real outside world and delivered via an SVS synthetic vision system, according to claim 11, wherein
the number of erroneous or inexploitable degrees of angular freedom of the right-side rotation $\hat{D}$, i.e. the matrix M01, is equal to 3 and the single erroneous or inexploitable degree of angular freedom of the left-side rotation $\hat{G}$, i.e. the matrix M3$t$, is the heading angle, it being assumed that the roll and pitch angles are known with a sufficient precision; and
the total number N of measurements is higher than or equal 4, and
the conjoint dual harmonization processor is configured to implement a step of solving the system of dual harmonization equations by executing a first set of substeps consisting in
in a fourth substep for i=2, . . . , N, calculating the matrices $\hat{U}_{1,i}$ and the vectors $\vec{q}_i$ using the equations:

$$\hat{U}_{1,i} = \hat{U}_1^T \cdot \hat{U}_i \text{ and } \vec{q}_i = \hat{Q}_i^T \cdot \vec{k},$$

the vector $\vec{k}$ being defined by the equation $$\vec{k} = \begin{pmatrix} 0 \\ 0 \\ 1 \end{pmatrix};$$

then
in an initialization fifth substep, initializing a first sequence of matrices $\{\hat{D}_{[s]}\}$, [s] designating the current integer rank of advancement through the sequence $\{\hat{D}_{[s]}\}$, by setting $\{\hat{D}_{[0]}\}$ equal to $I_3$, $I_3$ being the identity matrix; then
repeating an iterative sixth substep in which iteration [s+1] is passed to from iteration [s] by calculating the vector value $\vec{d}_{[s+1]}$, then the value $\hat{D}_{[s+1]}$ of the first matrix sequence $\{\hat{D}_{[s]}\}$, using the following equations:

$$\vec{d}_{[s+1]} = \frac{\sum_{i \geq 2} \left(\hat{U}_{1,i} \cdot \hat{D}_{[s]}^T \cdot \vec{q}_i\right)}{\left\|\sum_{i \geq 2} \left(\hat{U}_{1,i} \cdot \hat{D}^T \cdot \vec{q}_i\right)\right\|}$$

$$\hat{D}_{[s+1]} = \pi\left(\sum_{i \geq 2} \left(\vec{q}_i \cdot \vec{d}_{[s+1]}^T \cdot \hat{U}_{1,i}\right)\right)$$

the sequence $\{\vec{d}_{[s]}\}$ being an auxiliary second sequence of vectors and the sequence $\{\hat{D}_{[s]}\}$ converging to $\hat{D}$; and
stopping in a seventh substep the iterative process carried out throughout the sixth substep when the limit $\hat{D}$ is approximated with a sufficient precision defined by a preset threshold value.

14. The worn head-up system for displaying information pertaining to the piloting of an aircraft, said information being conformal to the real outside world and delivered via an SVS synthetic vision system, according to claim 9, wherein
the dual harmonization subsystem is configured, during the implementation of the readjusting measurements, to represent the piloting information serving as target, i.e. the symbology and/or the synthetic representation of the terrain and/or the image of an electromagnetic sensor, in a representation mode specific to the measuring mode, with a distinctive colour or a distinctive line style.

* * * * *

UNITED STATES PATENT AND TRADEMARK OFFICE
CERTIFICATE OF CORRECTION

PATENT NO. : 10,593,303 B2
APPLICATION NO. : 16/213932
DATED : March 17, 2020
INVENTOR(S) : Thierry Ganille et al.

It is certified that error appears in the above-identified patent and that said Letters Patent is hereby corrected as shown below:

In the Claims

In Claim 6, Column 19, Line 47, "$\hat{K}_{1,i}{}^T = \hat{K}_1{}^T \cdot \hat{K}_i;$" should be -- $\hat{K}_{1,i} = \hat{K}_1{}^T \cdot \hat{K}_i;$ --.

Signed and Sealed this
First Day of December, 2020

Andrei Iancu
*Director of the United States Patent and Trademark Office*